Feb. 26, 1957
W. A. HANE
2,783,376
HIGH SPEED POSITIVE PULSE GENERATOR
Filed Oct. 3, 1950
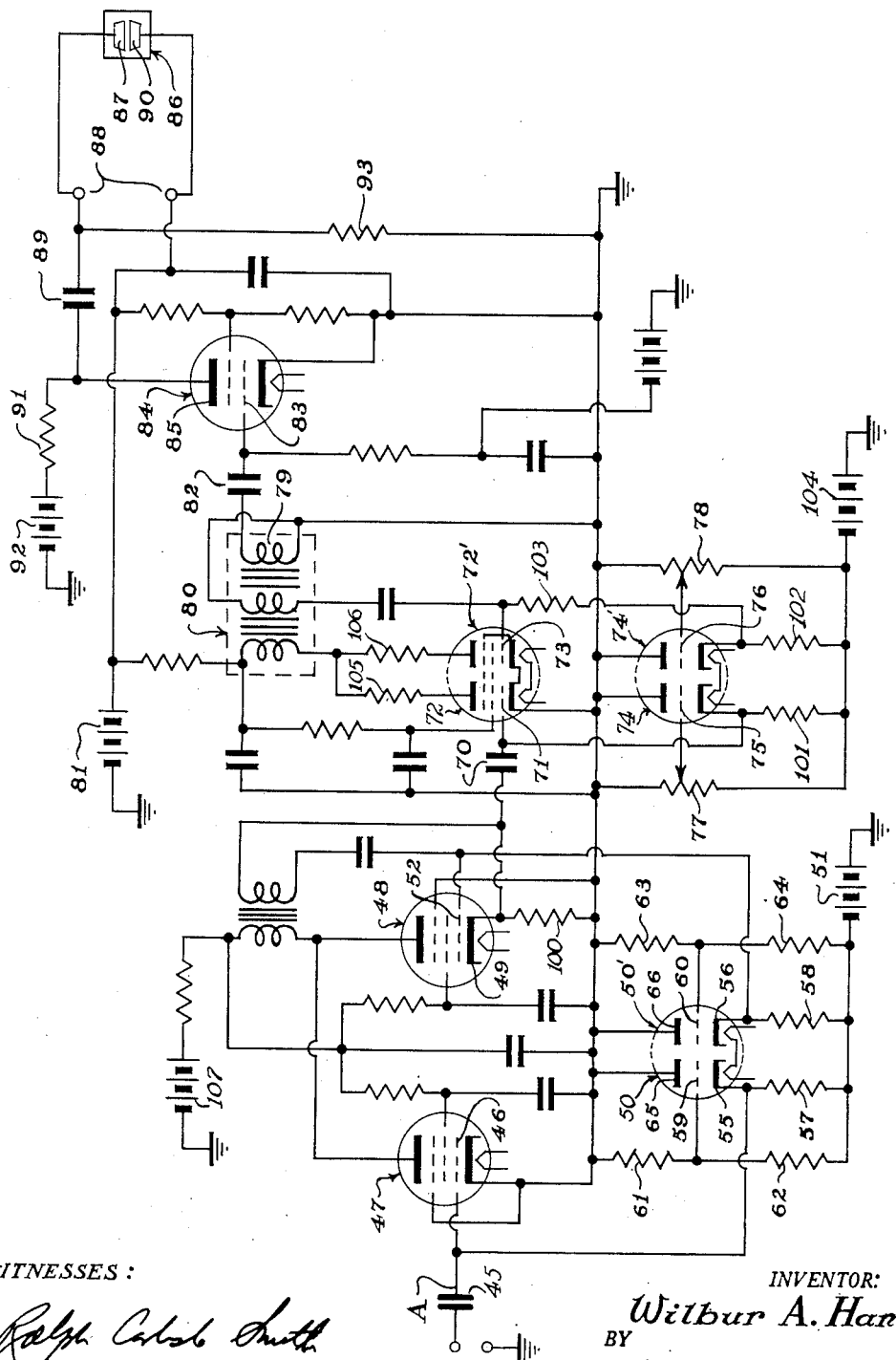
WITNESSES:
Ralph Carlyle Smith
Gene C. Newlin
INVENTOR:
Wilbur A. Hane
BY
Roland A. Anderson
Attorney

United States Patent Office 2,783,376
Patented Feb. 26, 1957

2,783,376

HIGH SPEED POSITIVE PULSE GENERATOR

Wilbur A. Hane, Seattle, Wash., assignor to the United States of America as represented by the United States Atomic Energy Commission Application October 3, 1950, Serial No. 188,234

2 Claims. (Cl. 250—27)

This invention relates to a pulse generator and more particularly to a high speed pulse generator for exciting a Kerr cell employed as a shutter on a high speed camera.

In cameras developed for ultra-high speed photography, for example, 40,000 frames per second, the use of mechanical shutters is prohibited due to inherent inertia and centrifugal velocity limitations. It is well known that to photograph for study purposes an event having a short duration such as one occuring in the matter of microseconds the shutter frequency must approach the velocity of the event being photographed. Shutters capable of these high frequencies have not been available in the past.

This invention comprises a pulse generator circuit for use with a high speed camera, the shutter of which comprises a Kerr cell.

The Kerr cell is a transparent enclosure containing a transparent substance such as nitrobenzine which exhibits electric double refraction. It has the property of permitting the passage of polarized light through it when its plane of polarization is orientated with the plane of polarization of said polarized light by an electric potential.

The pulse generator of this invention provides for the excitation of the Kerr cell with consecutive pulses of substantial amplitude and duration of substantially less than one microsecond. The pulses can have a selected repetition rate in the order of a megacycle.

An object of this invention is to provide a pulse generator for exciting a Kerr cell employed in a high speed shutter system in a high speed camera.

A still further object of this invention is to provide a pulse generator having output pulses of substantial amplitude with a base width of less than one microsecond and an internal spacing of the order of microseconds.

Other objects and advantages of the invention will be apparent from the following specification taken in connection with the drawings made a part hereof and the description of a presently preferred embodiment.

The drawing is a schematic diagram of the circuit of the pulse generator.

The pulse generator of this invention operates as follows:

Triggering pulses from an external source actuate a blocking oscillator where they are equalized, sharpened and amplified. From the cathode of the blocking oscillator the pulses are transmitted to an anode-triggered blocking oscillator from which they are transmitted as pulses of large amplitude and small width. These pulses are taken from a winding on a pulse transformer connected in the anode-triggered blocking oscillator. These large pulses from the pulse transformer are transmitted to a switch tube. A condenser charged to a high potential and a Kerr cell are connected in series between the anode and cathode of the switch tube. The large pulses discharge the condenser connected to the anode of the switch tube through the Kerr cell, so that its plane of polarization is rotated through one quadrant and returned with each pulse, thus operating with an appropriate polarized optical system as a high speed shutter.

Referring to the drawing, pulses from an external source of selected frequency are transmitted through condenser 45 over conductor A to the control grid of tube 47.

Tubes 47 and 48 cooperate as a parallel triggered blocking oscillator to reduce the time delay between the incoming pulses on control grid 46 of tube 47 and the output pulses at cathode 49 of tube 48. This time delay is reduced since the slope and amplitude of the input pulses are increased by the gain of the trigger tube 47. Also in the above parallel triggered blocking oscillator the pulses are sharpened, equalized and amplified. Anode power is provided by potential source 107.

An essential feature of the invention is the novel circuit of tubes 50 and 50' which provides a low resistance upon the cessation of each positive pulse to the circuits of the control grids 46 and 52 of tube 47 and 48, respectively, and a supply of direct current grid bias without causing excessive current drain from the bias battery 51. The cathodes 55 and 56 of tubes 50 and 50' are at a negative potential by connection through their respective resistors 57 and 58 to the bias battery 51. The control grids 59 and 60 are maintained at a predetermined negative bias less than that of the cathodes by the resistor divider network for each control grid consisting of resistors 61 and 62 for control grid 59 and resistors 63 and 64 for control grid 60 connected between the bias battery 51 and ground. The anodes 65 and 66 are connected directly to ground.

The pulses taken from cathode 49 of tube 48 across load resistor 100 are of fairly large amplitude and are very narrow, for example, about positive 135 volts high and 0.1 microsecond wide. These pulses are transmitted from cathode 49 through condenser 70 to the control grid 71 of blocking oscillator tube 72 and to the cathode of tube 74. With a positive pulse of the magnitude generated by stage 48 applied to the cathode of tube 74, it is evident that tube 74 is cut off and will present a high shunt resistance to grid 71 during the pulse; upon cessation of the pulse, 74 will again conduct presenting a low resistance in shunt with the grid 71 enabling rapid discharge of any charge accumulated in 70 as a result of tube 72 being driven into grid current. The stages 50, 50' and 74' will operate similarly. Blocking oscillator tubes 72 and 72' are connected as a conventional anode-triggered blocking oscillator. The circuits of tubes 74 and 74' differ from the circuits of tubes 50 and 50' in that the bias voltage from bias potential source 104 on their control grids 75 and 76 may be regulated by the respective variable resistor 77 or 78 to regulate the bias voltage on control grids 71 and 73 of tubes 72 and 72' for optimum operation. Bias control tubes 74 and 74' are provided with cathode load resistors 101 and 102 respectively in a like manner to the provision of cathode resistors 57 and 58 in the cathode circuits of tubes 50 and 50' respectively. The pulses from tube 48 are amplified and sharpened slightly by tubes 72 and 72'. When these pulses appear at the third winding 79 of pulse transformer 80 their amplitude is very large, for example, a positive 1000 volts which is variable with change in anode voltage supplied by battery 81.

The large positive pulses from winding 79 of pulse transformer 80 are transmitted through condenser 82 to the control grid 83 of tube 84 which is employed as a switch tube. Since tube 84 is employed as a switch tube its control 83 is biased very negative, for example, 500 to 700 volts. An energization potential in the neighborhood of 15,000 volts is impressed on anode 85 by potential source 92. In response to a positive pulse on control grid 83 of tube 84 from winding 79 the grid reduces the resistance of tube 84 to a very low value which reduces the anode potential from its normal potential of about a positive 15,000 volts to a potential near ground and grounds the anode side of condenser 89. Kerr cell 86 has one of its plates 87 connected to terminal 88 to the remaining terminal of condenser 89. The terminal of condenser 89 connected to the Kerr cell is at ground potential due to its being direct current grounded through resistor 93. The other plate 90 of the Kerr cell 86 is connected to positive terminal of battery 81, which essentially connects the Kerr cell in series with condenser 89 across the switch tube 84. When switch tube 84 is pulsed the Kerr cell 86 is pulsed by the discharge action of condenser 89. Upon termination of each positive pulse the condenser 89 recharges through anode resistor 91, the recharging time being determined by the time constant of the resistance-condenser circuit. The resistance-condenser circuit comprises resistor 91, condenser 89 and a parallel capacity which includes the capacity of tube 84, wiring capacity and the capacity of Kerr cell 86. The time constant of the resistance-condenser circuit is very short, for example, 0.08 microsecond.

It should be noted that what has been described is a Kerr cell exciter having novel features including the use of tubes 50 and 50', 74 and 74' to provide a low impedance return circuit for the control grids of tubes 47, 48 and 72, while allowing high resistance direct current paths for biasing potentials. A still further feature is subjecting a Kerr cell to a sequence of actuating pulses of duration and separation duration both of which are in the time order of less than one microsecond to permit photographic recording of events spaced in that order.

It will thus be apparent to those skilled in the art that this invention is by no means limited to the particular organization shown and described but that many modifications may be made without departing from the scope of this invention as set forth in the appended claims.

What is claimed is:

1. A bias control network for utilization with a grid controlled thermionic tube, having a capacitor connecting its control grid to a source of positive input pulses; comprising a bias control tube having at least a cathode, a control grid and an anode, means electrically connecting with substantially zero resistance the anode of the bias control tube to the cathode of the thermionic tube; a resistance, and a source of bias potential, said resistance being connected serially between the cathode of the bias control tube and the negative pole of the said source of bias potential, means electrically connecting the positive pole of said source of bias potential to the anode of said bias control tube, a resistance voltage divider having an adjustable tap connected across said source of bias potential, means electrically connecting said tap to the grid of said bias control tube, and means electrically connecting the cathode of the bias control tube directly to the junction of the grid of the thermionic tube and said capacitor, the magnitude of the output from said pulse source being sufficiently large to drive said bias control tube to cut-off.

2. A high speed heavy duty positive pulse amplifier comprising an amplifier tube and a bias control tube, said amplifier tube having at least a cathode, a control grid and an anode, a source of input pulses of positive polarity, a capacitance coupling said source of input pulses to said control grid, load means coupling the anode of amplifier tube to a source of anode potential, and electrically conducting means directly connecting the cathode of the amplifier tube to ground; said bias control tube having at least a cathode, a control grid and an anode, said anode being connected to ground, a resistance connecting said bias tube cathode to a source of negative potential, an adjustable voltage divider having an adjustable tap and one end connected to said source of negative potential and the other end being connected to ground, said voltage divider adjustable tap being connected to the bias control tube control grid, and the junction of the amplifier tube control grid and said capacitance being directly connected to the bias control tube cathode, the magnitude of the output from said pulse source being sufficiently large to drive said bias control tube to cut-off.

References Cited in the file of this patent

UNITED STATES PATENTS

| | | |
|---|---|---|
| 1,560,206 | Chaffee | Nov. 3, 1925 |
| 2,158,248 | Numans | May 16, 1939 |
| 2,308,360 | Fair | Jan. 12, 1943 |
| 2,504,480 | Wippert | Apr. 18, 1950 |
| 2,524,691 | Bliss | Oct. 3, 1950 |
| 2,525,634 | Atwood et al. | Oct. 10, 1950 |
| 2,539,133 | Hawadier | Jan. 23, 1951 |
| 2,551,771 | Spielman | May 8, 1951 |
| 2,553,284 | Sunstein | May 15, 1951 |
| 2,579,633 | Wadzinski | Dec. 25, 1951 |

FOREIGN PATENTS

| | | |
|---|---|---|
| 159,472 | Great Britain | Aug. 23, 1922 |